(12) United States Patent
Iuchi et al.

(10) Patent No.: US 10,665,360 B2
(45) Date of Patent: May 26, 2020

(54) METHOD FOR PRODUCING COMPOSITE BODY OF LITHIUM TITANATE PARTICLES AND CARBONACEOUS MATERIAL, AND COMPOSITE BODY OF LITHIUM TITANATE PARTICLES AND CARBONACEOUS MATERIAL

(71) Applicant: OTSUKA CHEMICAL CO., LTD., Osaka-shi, Osaka (JP)

(72) Inventors: Hirotoshi Iuchi, Tokushima (JP); Taiji Nakagawa, Tokushima (JP)

(73) Assignee: OTSUKA CHEMICAL CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/535,824

(22) PCT Filed: Dec. 3, 2015

(86) PCT No.: PCT/JP2015/084015
§ 371 (c)(1),
(2) Date: Jun. 14, 2017

(87) PCT Pub. No.: WO2016/098608
PCT Pub. Date: Jun. 23, 2016

(65) Prior Publication Data
US 2017/0346131 A1 Nov. 30, 2017

(30) Foreign Application Priority Data
Dec. 16, 2014 (JP) .................... 2014-253676

(51) Int. Cl.
*H01M 10/0525* (2010.01)
*C01B 32/05* (2017.01)
(Continued)

(52) U.S. Cl.
CPC ............. *H01B 1/08* (2013.01); *C01B 32/05* (2017.08); *C01G 23/005* (2013.01); *H01B 1/04* (2013.01);
(Continued)

(58) Field of Classification Search
CPC .. H01M 10/0525; H01M 4/485; H01M 4/583; H01M 2004/027; H01M 4/366;
(Continued)

(56) References Cited

U.S. PATENT DOCUMENTS

| 2,909,505 A | 10/1959 | Greenlee |
|---|---|---|
| 2011/0217593 A1 | 9/2011 | Dollinger et al. |

(Continued)

FOREIGN PATENT DOCUMENTS

| CN | 102186775 A | 9/2011 |
|---|---|---|
| CN | 102201570 A | 9/2011 |

(Continued)

OTHER PUBLICATIONS

English translation of the International Search Report dated Mar. 8, 2016, issued in counterpart of International Application No. PCT/JP2015/084015 (2 pages).

(Continued)

*Primary Examiner* — Matthew R Diaz
(74) *Attorney, Agent, or Firm* — Westerman, Hattori, Daniels & Adrian, LLP

(57) ABSTRACT

Provided is a production method that enables the production of a composite body of lithium titanate particles and a carbonaceous material, the composite body having excellent electrical characteristics and so on, and the composite body of lithium titanate particles and a carbonaceous material. A method for producing a composite body of lithium titanate particles and a carbonaceous material includes the steps of: preparing a raw material mixture using a titanium com- (Continued)

pound, a lithium compound, and an oligomer and/or raw material monomer of an alkali-soluble resin; and subjecting the raw material mixture to heat treatment under a non-oxidizing atmosphere to produce the composite body.

17 Claims, 3 Drawing Sheets

(51) Int. Cl.

| | | |
|---|---|---|
| *C01G 23/00* | (2006.01) | |
| *H01B 1/04* | (2006.01) | |
| *H01B 1/08* | (2006.01) | |
| *H01G 11/34* | (2013.01) | |
| *H01G 11/44* | (2013.01) | |
| *H01G 11/46* | (2013.01) | |
| *H01G 11/50* | (2013.01) | |
| *H01G 11/86* | (2013.01) | |
| *H01M 4/36* | (2006.01) | |
| *H01M 4/485* | (2010.01) | |
| *H01M 4/583* | (2010.01) | |
| *H01G 11/06* | (2013.01) | |
| *H01M 4/02* | (2006.01) | |

(52) U.S. Cl.
CPC ............ *H01G 11/34* (2013.01); *H01G 11/44* (2013.01); *H01G 11/46* (2013.01); *H01G 11/50* (2013.01); *H01G 11/86* (2013.01); *H01M 4/36* (2013.01); *H01M 4/485* (2013.01); *H01M 4/583* (2013.01); *H01M 10/0525* (2013.01); *C01P 2002/72* (2013.01); *C01P 2004/03* (2013.01); *C01P 2006/40* (2013.01); *H01G 11/06* (2013.01); *H01M 2004/027* (2013.01); *Y02E 60/13* (2013.01)

(58) Field of Classification Search
CPC ...... C01B 32/05; C01G 23/005; H01G 11/06; H01G 11/24; H01G 11/34; H01G 11/46; H01G 11/86; H01G 11/44; H01G 11/50; C01P 2002/72; C01P 2004/03; C01P 2006/40; H01B 1/04; H01B 1/08
USPC ........................................................ 252/500
See application file for complete search history.

(56) References Cited

U.S. PATENT DOCUMENTS

| | | |
|---|---|---|
| 2011/0236299 A1 | 9/2011 | Jian et al. |
| 2011/0262809 A1 | 10/2011 | Kumagai et al. |
| 2014/0099251 A1 | 4/2014 | Yong-Mook et al. |
| 2014/0175687 A1* | 6/2014 | Dollinger ............... B82Y 30/00 264/13 |
| 2014/0225041 A1 | 8/2014 | Archer et al. |
| 2016/0233483 A1 | 8/2016 | Gao et al. |

FOREIGN PATENT DOCUMENTS

| | | | |
|---|---|---|---|
| CN | 103456939 A | 12/2013 | |
| CN | 103764546 A | 4/2014 | |
| JP | 2012-6816 A | 1/2012 | |
| JP | 2012-121803 A | 6/2012 | |
| JP | 2014-523468 A | 9/2014 | |
| WO | 2010/052950 A1 | 5/2010 | |
| WO | WO 2013003836 A3 * | 4/2013 | ............ C01G 39/06 |

OTHER PUBLICATIONS

Notification of Transmittal of Translation of the International Preliminary Report on Patentability dated Dec. 3, 2015, issued in PCT/JP2015/084015.
Office Action dated Jan. 22, 2018, issued in Taiwanese Patent Application No. 104141583.
Extended European Search Report dated Aug. 1, 2018, issued in European Patent Application No. 15869814.2 (PCT/JP2015084015).
Office Action dated Sep. 25, 2019, issued in Chinese Patent Application No. 201580068931.8.

* cited by examiner

[FIG. 1]
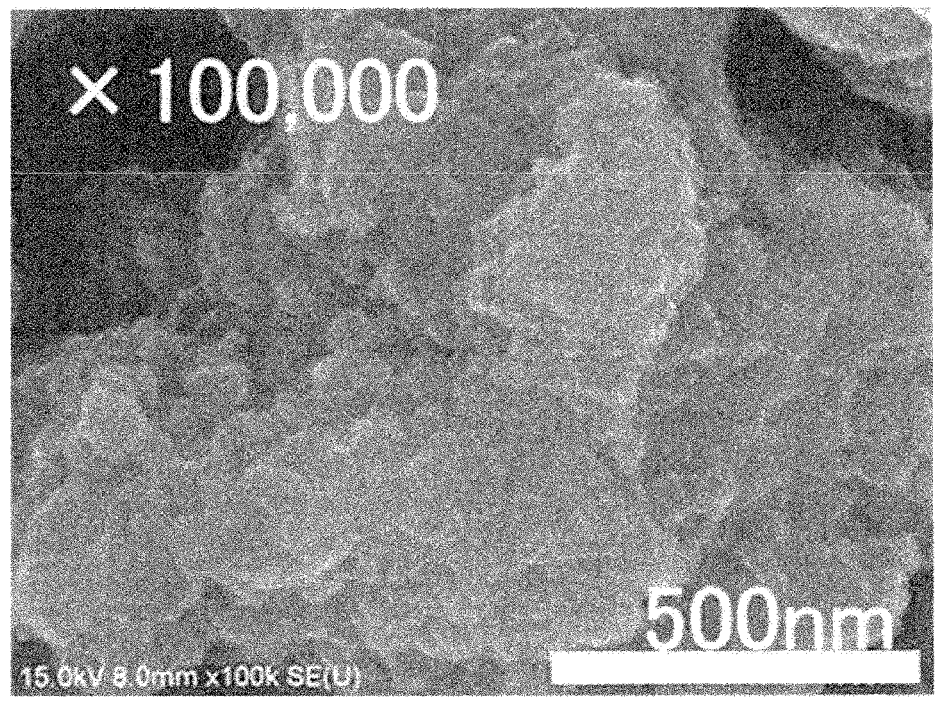
[FIG. 2]
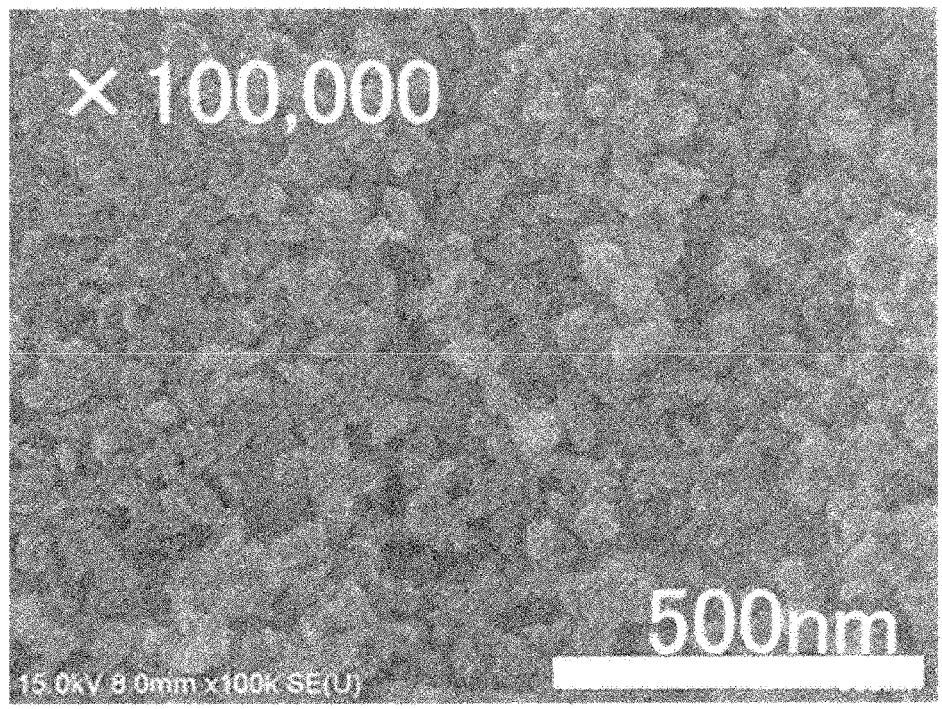

[FIG. 3]
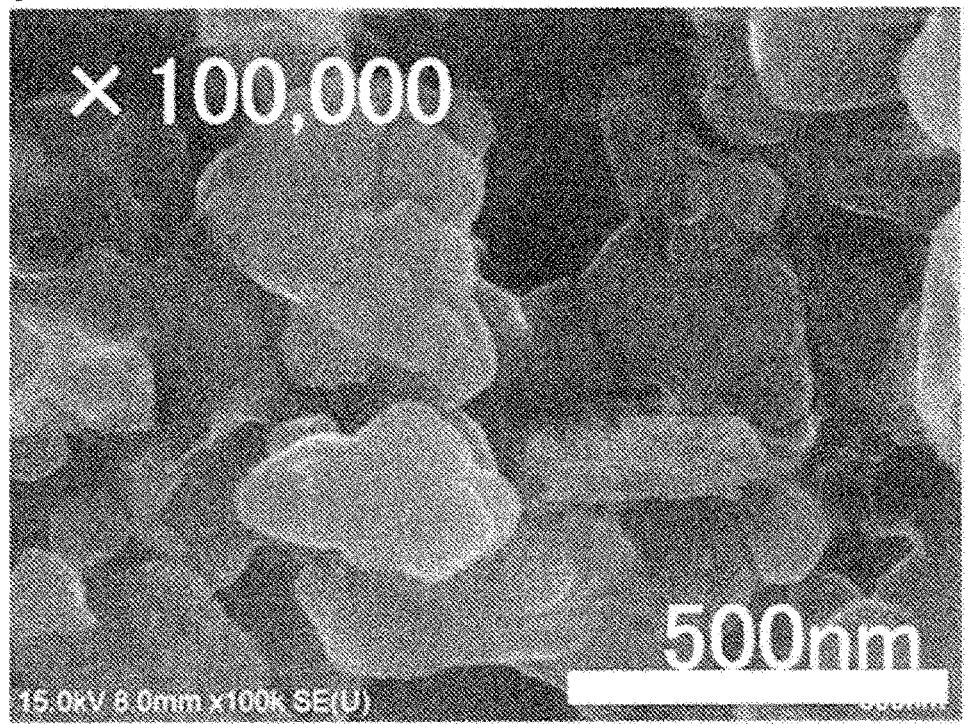
[FIG. 4]
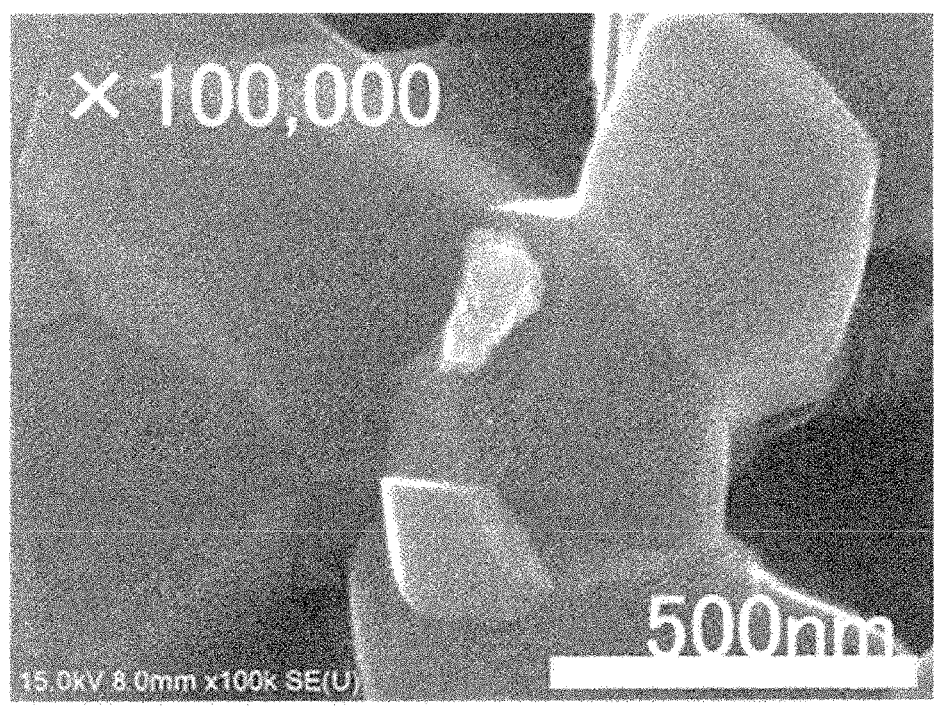

[FIG. 5]
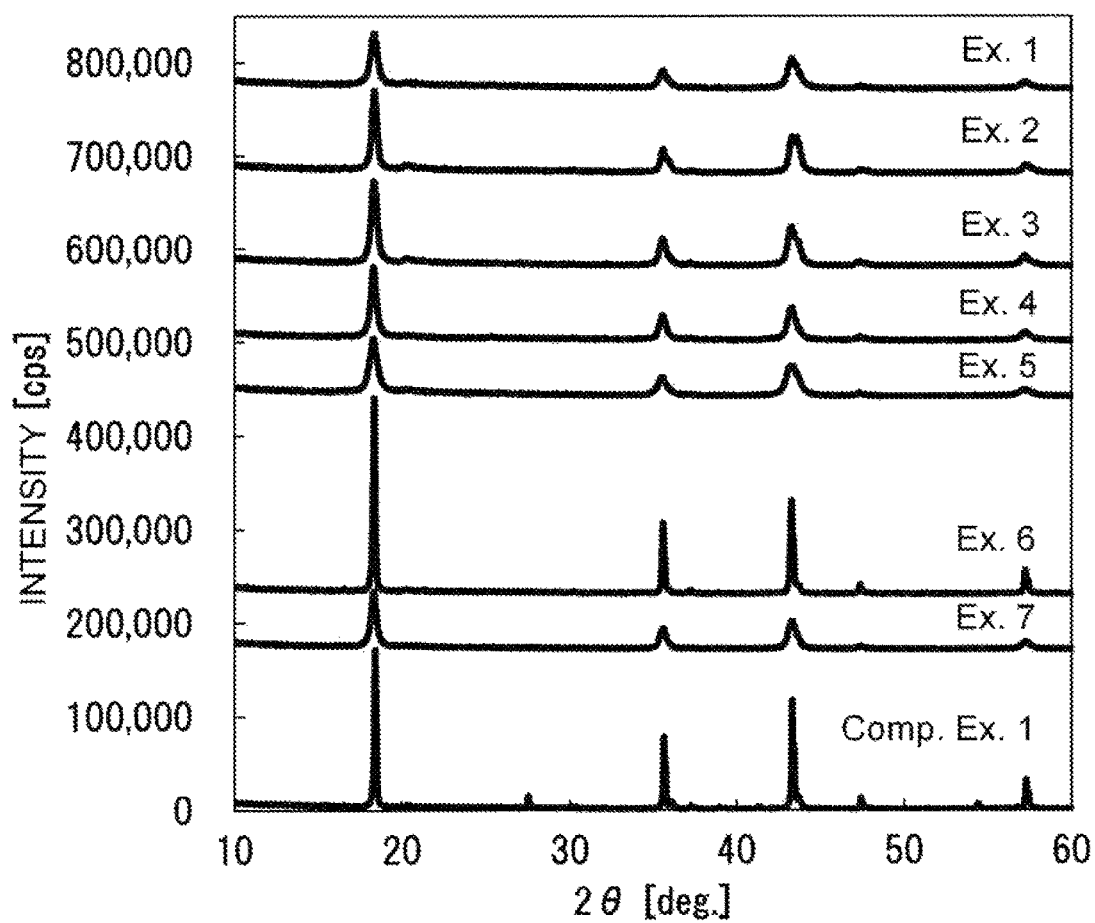

METHOD FOR PRODUCING COMPOSITE BODY OF LITHIUM TITANATE PARTICLES AND CARBONACEOUS MATERIAL, AND COMPOSITE BODY OF LITHIUM TITANATE PARTICLES AND CARBONACEOUS MATERIAL

TECHNICAL FIELD

The present invention relates to a method for producing a composite body of lithium titanate particles and a carbonaceous material and a composite body of lithium titanate particles and a carbonaceous material.

BACKGROUND ART

Lithium-ion cells have recently been widely used as large-capacity cells. However, because the lithium-ion cells have a mechanism in which graphite or the like is used for an anode electrode and they are operated by inserting and desorbing lithium ions into and from the negative electrode, it is generally pointed out that they may cause precipitation of metal lithium and therefore still have a safety problem.

It is known, as a method for avoiding this problem, to use lithium titanate represented by $Li_{1.33}Ti_{1.66}O_4$, $LiTi_2O_4$ or others as a material for the negative electrode. Lithium titanate has a voltage of 1.5 V in terms of lithium, exhibits substantially no change in crystal structure resulting from charging and discharging, and therefore has been drawing attention as an electrode material having good safety and service life.

Meanwhile, in order to enhance the cell characteristics, particularly the power output characteristic, various types of development have been made, such as a technique in which lithium titanate is finely ground and an electrode with the ground lithium titanate carried on carbon is used.

Patent Literature 1 proposes lithium titanate fine particles obtained by subjecting a powder mixture of a titanium compound and a lithium compound to heat treatment.

CITATION LIST

Patent Literature

Patent Literature 1: JP-A-2012-6816

SUMMARY OF INVENTION

Technical Problem

However, the production method in Patent Literature 1 requires long-time heat treatment (firing) at high temperatures, which causes sinter of the particles, resulting in difficulty providing fine particles.

An object of the present invention is to provide a production method that enables the production of a composite body of lithium titanate particles and a carbonaceous material, the composite body having excellent electrical characteristics and so on, and the composite body of lithium titanate particles and a carbonaceous material.

Solution to Problem

The present invention provides the following production method that enables the production of a composite body of lithium titanate particles and a carbonaceous material, the following composite body of lithium titanate particles and a carbonaceous material, and the following electrochemical device electrode and electrochemical device in which the composite body is used.

Aspect 1: A method for producing a composite body of lithium titanate particles and a carbonaceous material, the method including the steps of: preparing a raw material mixture using a titanium compound, a lithium compound, and an oligomer and/or raw material monomer of an alkali-soluble resin; and subjecting the raw material mixture to heat treatment under a non-oxidizing atmosphere to produce the composite body.

Aspect 2: The method for producing a composite body of lithium titanate particles and a carbonaceous material according to aspect 1, wherein the alkali-soluble resin has, in a main chain or a side chain thereof, a hydroxyl group, a phenolic hydroxyl group, and/or a carboxyl group.

Aspect 3: The method for producing a composite body of lithium titanate particles and a carbonaceous material according to aspect 1 or 2, wherein the temperature of the heat treatment is 800 to 1000° C.

Aspect 4: A composite body of lithium titanate particles and a carbonaceous material, the composite body being produced by the method according to any one of aspects 1 to 3.

Aspect 5: An electrochemical device electrode containing the composite body according to aspect 4.

Aspect 6: An electrochemical device including the electrochemical device electrode according to aspect 5.

Advantageous Effects of Invention

According to the production method of the present invention, a composite body of lithium titanate particles and a carbonaceous material having excellent electrical characteristics and so on can be easily produced.

The composite body of lithium titanate particles and a carbonaceous material according to the present invention has excellent electrical characteristics and so on and exhibits a good discharge capacity retention, for example, when used for an electrochemical device electrode or the like.

BRIEF DESCRIPTION OF DRAWINGS

FIG. 1 is a scanning electron micrograph showing a composite body in Example 1 according to the present invention.

FIG. 2 is a scanning electron micrograph showing lithium titanate particles contained in the composite body in Example 1 according to the present invention.

FIG. 3 is a scanning electron micrograph showing a composite body in Example 6 according to the present invention.

FIG. 4 is a scanning electron micrograph showing lithium titanate particles in Comparative Example 1.

FIG. 5 is X-ray diffraction charts for the composite bodies in Examples 1 to 7 and lithium titanate particles in Comparative Example 1.

DESCRIPTION OF EMBODIMENTS

Hereinafter, a description will be given of an example of a preferred embodiment for working of the present invention. However, the following embodiment is simply illustrative. The present invention is not at all limited to the following embodiment.

<Composite Body of Lithium Titanate Particles and Carbonaceous Material>

A composite body of lithium titanate particles and a carbonaceous material in a preferred embodiment of the present invention has the feature that the surfaces of lithium titanate particles are partly or entirely coated with a carbonaceous material.

The carbonaceous material described above is a carbonaceous material obtained by carbonizing a precursor fabricated using a lithium compound and an oligomer and/or raw material monomer of an alkali-soluble resin.

Lithium titanate described above is, for example, a compound represented by a general formula $Li_xTi_yO_4$ wherein the Li/Ti molar ratio of 0.68 to 0.82, x is within a range of 1 to 1.67, and y is within a range of 1.33 to 2. Specifically, it is preferably a compound consisting mainly of lithium titanate having a spinel crystal structure represented by, for example, $Li_{1.33}Ti_{1.66}O_4$. The above lithium titanate may partly contain a mixture of $Li_2TiO_3$, $LiTiO_2$, and $TiO_2$ without hindering the effects of the present invention.

A method for producing a composite body according to the present invention includes the steps of: preparing a raw material mixture using a titanium compound, a lithium compound, and an oligomer and/or raw material monomer of an alkali-soluble resin; and subjecting the raw material mixture to heat treatment under a non-oxidizing atmosphere. The composite body according to the present invention can be obtained by subjecting a raw material mixture to heat treatment under a non-oxidizing atmosphere to obtain a particle agglomerate and subjecting the obtained particle agglomerate to pulverization, classification, and so on in the usual manner or the obtained particle agglomerate can be used as the composite body as it is.

(Raw Material Mixture)

The raw material mixture in the present invention is a titanium compound whose surface is partly or entirely coated with a precursor of a carbonaceous material fabricated using a lithium compound and an oligomer and/or raw material monomer of an alkali-soluble resin. Examples of the step of preparing a raw material mixture in the present invention include: a method of obtaining a raw material mixture by mixing a solvent, a titanium compound, a lithium compound, and an oligomer of an alkali-soluble resin and drying the resultant mixture; and a method of mixing a solvent, a titanium compound, a lithium compound, and a raw material monomer of an alkali-soluble resin and drying the resultant mixture. Preferred among them is the method of mixing a solvent, a titanium compound, a lithium compound, and a raw material monomer of an alkali-soluble resin and drying the resultant mixture.

There is no particular limitation as to the mixing means and the mixing means may be usual, simple mixing means or mixing using a ball mill, a bead mill or other mills.

Examples of the solvent that can be used include: water; alcohols, such as methanol, ethanol, 1-propanol, 2-propanol, and 1-butanol; acetone; and mixture solvents of them and water is preferably used because of its high versatility.

The drying has only to meet a condition where the solvent used can be removed, and the drying can be implemented by heat application or other processes. For example, in the case of drying by heat application under a non-oxidizing atmosphere, the drying can be performed simultaneously with the heat treatment to be described hereinafter. Alternatively, in the case of drying by heat application under an oxidizing atmosphere, for example, when water is used as the solvent, the drying is preferably done at 60 to 190° C.

The titanium compound that is preferably used is a compound containing titanium oxide (IV) or a compound producing titanium oxide (IV) by heat application. Examples of these titanium compounds include: rutile, anatase, and brookite titanium oxides (IV); rutile ores; aqueous titania; and wet cake of titanium hydroxide. The average primary particle diameter of the titanium compound can be appropriately selected according to the average particle diameter of desired lithium titanate particles, but is generally 1 to 99 nm and preferably 5 to 80 nm. If the average primary particle diameter is 1 to 99 nm, fine lithium titanate particles having excellent electrical characteristics and so on can be obtained. There is no particular limitation as to the average particle diameter of the titanium compound so long as the particles are in such an agglomeration state that they are dispersed to create voids between their primary particles when mixed with other raw materials and resin can penetrate the voids, and, as needed, a mixture previously formed in a slurry by mixing the titanium compound with a solvent and sufficiently stirred may be used.

The lithium compound that is preferably used is a compound acting as an alkali catalyst and producing lithium oxide by heating. Examples of the lithium compound include lithium carbonate, lithium acetate, and lithium hydroxide. Preferred among them is lithium acetate that is weakly basic, can be easily controlled because of its slow rate of reaction, and has a high solubility in water. Furthermore, when lithium carbonate, lithium hydroxide, or like lithium compounds having a low solubility in water is used, it may be used by previously dissolving it in a weakly acidic aqueous solution using an acid, such as acetic acid or citric acid.

The preferred alkali-soluble resin is one having a hydroxyl group, a phenolic hydroxyl group, and/or a carboxyl group in a main chain or a side chain thereof and examples include novolac resins; resol resins; polyvinyl phenol resins; acrylic resins, such as methacrylate resins and methacrylic ester resins; copolymers of acrylic acid derivatives having a phenolic hydroxyl group; cycloolefin resins; and polyamide resins. Preferred among them are novolac resins, resol resins, and polyvinyl phenol resins each having a phenolic hydroxyl group in a main chain or a side chain thereof, and copolymers of acrylic acid derivatives having a phenolic hydroxyl group and the particularly preferred are resol resins capable of being polymerized in the presence of an alkali catalyst.

The resol resin is a reactant obtained by reaction of a phenolic compound with an aldehyde compound in the presence of an alkali catalyst and examples of a raw material monomer of such a resol resin include phenolic compounds and aldehyde compounds below.

Phenolic compounds having any valence can be used without any particular limitation. Examples of the phenolic compounds include: monovalent phenolic compounds, such as phenol, o-cresol, m-cresol, p-cresol, thymol, and naphthol; divalent phenolic compounds, such as resorcinol, catechol, hydroquinone, and dihydroxynaphthalene; and trivalent phenolic compounds, such as pyrogallol. Preferred among them are monovalent phenolic compounds and divalent phenolic compounds and divalent phenolic compounds are more preferred in terms of increasing the reactivity with an aldehyde compound and forming a three-dimensional cross-linked structure.

The aldehyde compound that is preferably used is one capable of forming a three-dimensional cross-linked structure by reaction with a phenolic compound. Examples of this aldehyde compound include formaldehyde, acetaldehyde, butylaldehyde, salicylaldehyde, benzaldehyde, and compounds producing aldehyde by decomposition. Examples of the above compounds producing aldehyde include paraformaldehyde, trioxane, and hexamethylenetetramine. Among them, formaldehyde and compounds producing formaldehyde by decomposition are preferably used because of their high reactivity and compounds producing formaldehyde by decomposition are particularly preferably used in terms of initial discharge capacity and discharge capacity retention. The aldehyde compound can also be used in a state where it is previously dissolved in a water solvent or the like. The reason why a composite body produced using a compound producing formaldehyde by decomposition has particularly excellent electrical characteristics is not clear, but can be considered to be that gradual production of formaldehyde by decomposition decreases the specific surface area of the resultant composite body and the crystallinity of the carbonaceous material, thus reducing the decomposition of an electrolytic solution by the carbonaceous material.

There is no particular limitation as to the mixture ratio between the phenolic compound and the aldehyde compound, but the molar ratio (F/P) of the aldehyde compound (F) to the phenolic compound (P) is generally 0.1 to 10.0, preferably 0.3 to 7.0, and more preferably 0.5 to 4.0.

There is no particular limitation as to the ratio of mixing of the lithium compound, but the molar ratio (C/P) of the lithium compound (C) to the phenolic compound (P) is generally 1.0 to 9.0, preferably 1.1 to 6.0, and more preferably 1.2 to 4.0. When the molar ratio (C/P) is 1.0 to 9.0, the lithium compound suitably acts as an alkali catalyst during reaction between the phenolic compound and the aldehyde compound and also as a raw material for lithium titanate.

The ratio of mixing of the titanium compound is basically selected so that the mixture ratio between the lithium compound and the titanium compound is the Li/Ti ratio (molar ratio) in a desired lithium titanate, but no problem is caused by changing it within a range of about ±10%.

There is no particular limitation as to the ratio of mixing of the solvent, but the ratio is generally 30 to 70% by mass relative to the total amount of the phenolic compound, the aldehyde compound, the lithium compound, and the titanium compound.

(Heat Treatment)

There is no particular limitation as to the atmosphere for the heat treatment so long as it is a non-oxidizing atmosphere, but the heat treatment can be preferably conducted under an inactive gas atmosphere, such as nitrogen or argon, or a substantially inactive atmosphere where a slight amount of oxygen exists in an inactive gas.

The heat treatment is preferably performed at a temperature of 800 to 1000° C. and more preferably 800 to 900° C. If the heating temperature is 800 to 1000° C., the production of lithium titanate and the carbonization of the precursor of the carbonaceous material can be simultaneously performed.

The time for the heat treatment has only to be the time taken to produce lithium titanate and carbonize the precursor of the carbonaceous material, but it is preferably 0.5 to 12 hours and more preferably 1 to 6 hours.

According to the production method of the present invention, since a carbonaceous material is produced simultaneously with the production of lithium titanate by subjecting a titanium compound whose surface is partly or entirely coated with the precursor obtained by penetration of resin in voids between primary particles of the titanium compound to heat treatment under a non-oxidizing atmosphere, it can be prevented that the particle diameter of minimum units of lithium titanate particles identifiable as individual particles increases.

The average particle diameter of the composite body according to the present invention is preferably within a range of 1 to 500 μm, more preferably within a range of 1 to 200 μm, and still more preferably within a range of 1 to 100 μm. The average particle diameter of the lithium titanate particles contained in the composite body is preferably within a range of 10 to 99 nm and more preferably within a range of 20 to 60 nm. If the average particle diameter of the composite body and the average particle diameter of lithium titanate particles contained in the composite body are within the above ranges, the electrical characteristics and so on can be further enhanced. In using the composite body for an electrochemical device electrode, the above ranges are preferably employed from the viewpoint of handling during production of an electrode for a lithium-ion cell or the like and the cell characteristics.

In the present invention, the average particle diameter of lithium titanate particles contained in the composite body can be determined by measuring, using a scanning electron microscope, the lengths of 1000 particles randomly selected from lithium titanate particles obtained by burning the carbonaceous material off from the composite body and calculating the arithmetic average of the lengths.

As used in the present invention, the average particle diameter of the composite body means the particle diameter at 50% cumulative volume in a particle size distribution as determined by the laser diffraction and scattering method.

The lithium titanate particles preferably have a shape having no anisotropy. Here, the shape having no anisotropy means the shape having no one-dimensional anisotropy (fibrous or the like) or the shape having no two-dimensional anisotropy (platy or the like). Therefore, the shape having no anisotropy in the present invention means a non-platy and non-fibrous shape.

There is no particular limitation as to the crystallite diameter of the lithium titanate particles, but it is preferably within a range of 10 to 60 nm. If the crystallite diameter is within the above range, the electrical characteristics and so on can be further enhanced. The crystallite diameter can be calculated by applying the Scherrer formula to the full width at half-maximum of the X-ray diffraction peak.

There is no particular limitation as to the specific surface area of the composite body according to the present invention, but it is preferably within a range of 1 to 200 m/g and more preferably within a range of 10 to 150 $m^2/g$. If the specific surface area is within the above ranges, the electrical characteristics and so on can be further enhanced. In using the composite body for an electrochemical device electrode, the above ranges are preferably employed from the viewpoint of handling during production of an electrode for a lithium-ion cell or the like and the cell characteristics.

<Electrochemical Device>

Since the composite body according to the present invention has excellent electrical characteristics, it can be suitably used as an electrochemical device electrode by kneading and forming it together with an electronic conductor, such as carbon black, a binder, such as a fluorine-contained resin, and so on. Examples of the electrochemical device in which the above electrode can be used include an electrical double layer capacitor, a lithium-ion capacitor, and a lithium-ion cell.

EXAMPLES

The present invention will be described below in further detail with reference to specific examples. The present invention is not at all limited by the following examples and modifications and variations may be appropriately made therein without changing the gist of the invention.

The X-ray diffraction was measured using "Ultima IV" manufactured by Rigaku Corporation together with a Cu X-ray tube and a D/tex Ultra 2 detector at a voltage of 40 kV, a current of 40 mA, and a sampling interval of 0.02°. As for the full width at half-maximum, the X-ray diffraction pattern was smoothed, the background was then subtracted using the Sonneveld-Visser algorithm, and the full width at half-maximum of the diffraction peak at 2θ=18°, which is a main peak of spinel lithium titanate, was then calculated. The crystallite diameter was determined from the above full width at half-maximum using the Scherrer formula.

The shape of the composite body was observed using a scanning electron microscope (SEM) (S-4800 manufactured by Hitachi High-Technologies Corporation). The average particle diameter of the composite body was measured with a laser diffraction particle diameter distribution measurement device "SALD-2100" manufactured by Shimadzu Corporation. The average particle diameter means the particle diameter at 50% cumulative volume in a particle size distribution as determined by the laser diffraction method.

The specific surface area of the composite body was measured by the BET method using "TriStar II" manufactured by Micromeritics Instrument Corporation.

Example 1

Resorcinol (0.4 mol) as a phenolic compound, a 37% by mass aqueous solution of formaldehyde (0.7 mol) as an aldehyde compound, and water (8.9 mol) as a solvent were added into a beaker and mixed for five minutes.

Lithium acetate (1.5 mol) was added as a lithium compound to the resultant mixture solution and the mixture solution was mixed for ten minutes until the lithium compound was fully dissolved in the solution, thereby obtaining a sol.

Particles of anatase titanium oxide (IV) (1.8 mol, average primary particle diameter: 10 nm) were added as a titanium compound to the resultant sol solution and the mixture was mixed for 15 minutes and then dried at 120° C. for four hours under an air atmosphere.

The resultant dried product was subjected to heat treatment at 875° C. for two hours under a nitrogen atmosphere and pulverized in a mortar, thereby obtaining a composite body of lithium titanate particles and a carbonaceous material. FIG. 1 shows a SEM photograph of the resultant composite body. The magnification of the photograph is 100,000-fold.

The resultant composite body was found by the X-ray diffraction to have a spinel crystal phase of $Li_{1.33}Ti_{1.66}O_4$, a full width at half-maximum of 0.45°, and a crystallite diameter of 17 nm. FIG. 5 shows an X-ray diffraction chart for the composite body. The specific surface area was 118 $m^2/g$ and the average particle diameter was 7 µm.

The nature of the lithium titanate particles contained in the resultant composite body was checked by burning the carbonaceous material off from the composite body and pulverizing the rest in a mortar. FIG. 2 shows a SEM photograph of the resultant lithium titanate particles. The magnification of the photograph is 100,000-fold.

The shape of the lithium titanate particles was observed using a scanning electron microscope (SEM) (S-4800 manufactured by Hitachi High-Technologies Corporation). The lengths of observed 1000 primary particles were determined using analysis software "WinROOF" (made by MITANI CORPORATION) and the arithmetic average of the lengths was determined as an average primary particle diameter. For measurement of the average primary particle diameter of the lithium titanate particles, the SEM photograph observed at 100,000-fold magnification was used. The primary particles as used herein mean individual particles capable of forming a secondary particle, that is, minimum units of particles identifiable as individual particles.

The average secondary particle diameter of the lithium titanate particles was measured with a laser diffraction particle diameter distribution measurement device "SALD-2100" manufactured by Shimadzu Corporation. The specific surface area of the lithium titanate particles was measured by the BET method using "TriStar II" manufactured by Micromeritics Instrument Corporation. The average secondary particle diameter means the particle diameter at 50% cumulative volume in a particle size distribution as determined by the laser diffraction method.

The specific surface area of the lithium titanate particles was 65 $m^2/g$, the average secondary particle diameter thereof was 5 µm, and the average primary particle diameter thereof was 23 nm.

Example 2

A composite body of lithium titanate particles and a carbonaceous material was obtained in the same manner as in Example 1 except that the phenolic compound was changed to phenol (0.4 mol) and the aldehyde compound was changed to a 37% by mass aqueous solution of formaldehyde (0.9 mol).

The resultant composite body was found by the X-ray diffraction to have a spinel crystal phase of $Li_{1.33}Ti_{1.66}O_4$, a full width at half-maximum of 0.43°, and a crystallite diameter of 19.6 nm. FIG. 5 shows an X-ray diffraction chart for the composite body. The specific surface area was 43 $m^2/g$ and the average particle diameter was 38 µm.

Example 3

A composite body of lithium titanate particles and a carbonaceous material was obtained in the same manner as in Example 1 except that the phenolic compound was changed to m-cresol (0.4 mol).

The resultant composite body was found by the X-ray diffraction to have a spinel crystal phase of $Li_{1.33}Ti_{1.66}O_4$, a full width at half-maximum of 0.38°, and a crystallite diameter of 22 nm. FIG. 5 shows an X-ray diffraction chart for the composite body. The specific surface area was 77 $m^2/g$ and the average particle diameter was 7 µm.

Example 4

A composite body of lithium titanate particles and a carbonaceous material was obtained in the same manner as in Example 1 except that the aldehyde compound was changed to hexamethylenetetramine (0.04 mol).

The resultant composite body was found by the X-ray diffraction to have a spinel crystal phase of $Li_{1.33}Ti_{1.66}O_4$, a full width at half-maximum of 0.33°, and a crystallite diameter of 26 nm. FIG. 5 shows an X-ray diffraction chart for the composite body. The specific surface area was 75 $m^2/g$ and the average particle diameter was 4 µm.

Example 5

A composite body of lithium titanate particles and a carbonaceous material was obtained in the same manner as in Example 1 except that the titanium compound was changed to aqueous titanium hydroxide particles (1.8 mol, average primary particle diameter: 10 nm).

The resultant composite body was found by the X-ray diffraction to have a spinel crystal phase of $Li_{1.33}Ti_{1.66}O_4$, a full width at half-maximum of 0.430, and a crystallite diameter of 19.6 nm. FIG. 5 shows an X-ray diffraction chart for the composite body. The specific surface area was 38 m=/g and the average particle diameter was 82 μm.

Example 6

A composite body of lithium titanate particles and a carbonaceous material was obtained in the same manner as in Example 1 except that the titanium compound was changed to anatase titanium oxide (IV) particles (1.8 mol, average primary particle diameter: 150 nm). FIG. 3 shows a SEM photograph of the resultant composite body. The magnification of the photograph is 100,000-fold.

The resultant composite body was found by the X-ray diffraction to have a spinel crystal phase of $Li_{1.33}Ti_{1.66}O_4$, a full width at half-maximum of 0.150, and a crystallite diameter of 56 nm. FIG. 5 shows an X-ray diffraction chart for the composite body. The specific surface area was 9 $m^2/g$ and the average particle diameter was 9 μm.

Example 7

A composite body of lithium titanate particles and a carbonaceous material was obtained in the same manner as in Example 1 except that the lithium compound was changed to lithium hydroxide (0.5 mol).

The resultant composite body was found by the X-ray diffraction to have a spinel crystal phase of $Li_{1.33}Ti_{1.66}O_4$, a full width at half-maximum of 0.33°, and a crystallite diameter of 25 nm. FIG. 5 shows an X-ray diffraction chart for the composite body. The specific surface area was 71 $m^2/g$ and the average particle diameter was 19 μm.

Comparative Example 1

Lithium acetate (1.5 mol) as a lithium compound and water (8.9 mol) as a solvent were added into a beaker and mixed for ten minutes until lithium acetate was fully dissolved in water.

Particles of anatase titanium oxide (IV) (1.8 mol, average primary particle diameter: 10 nm) were added as a titanium compound to the resultant solution and the mixture was mixed for 15 minutes and then dried at 120° C. for four hours under an air atmosphere.

The resultant dried product was subjected to heat treatment at 875° C. for two hours under a nitrogen atmosphere and pulverized in a mortar, thereby obtaining lithium titanate particles. FIG. 4 shows a SEM photograph of the resultant lithium titanate particles. The magnification of the photograph is 100,000-fold.

The resultant lithium titanate particles were found by the X-ray diffraction to be rutile titanium oxide (IV) having a crystal phase of $Li_{1.33}Ti_{1.66}O_4$, a full width at half-maximum of 0.150, and a crystallite diameter of 81 nm. FIG. 5 shows an X-ray diffraction chart for the lithium titanate particles. The specific surface area was 1.2 $m^2/g$, the average secondary particle diameter was 400 μm, and the average primary particle diameter was 331 nm. The specific surface area, average secondary particle diameter, and average primary particle diameter of the lithium titanate particles were measured in the same manners as in Example 1. For measurement of the average primary particle diameter of the lithium titanate particles, the SEM photograph observed at 10,000-fold magnification was used.

<Production of Cell>

The composite body in Example 1 and SBR rubber (BM400B manufactured by Zeon Corporation) as a binder were mixed, together with a slight amount of water, into a slurry in a mortar to give a mass ratio of the composite body to SBR rubber of 97.5:2.5, thereby preparing an electrode composition. This electrode composition was applied onto an aluminum current collector and dried, thereby obtaining an electrode.

The resultant electrode was placed through a microporous polyolefin film opposite a lithium metal foil in a coin cell battery into which $LiBF_4$ and a propylene carbonate solution were injected, thereby producing a half-cell.

Half-cells were also produced from the composite bodies in Examples 2 to 7 and the lithium titanate particles in Comparative Example 1 in the same manner as described above.

<Evaluation of Cell>

The initial discharge capacities and discharge capacity retentions of the half-cells obtained as above were evaluated and the results are shown in Table 1. The initial discharge capacity and discharge capacity retention were determined in the following manners.

(Initial Discharge Capacity)

The cell evaluation was performed at 25° C. A counter electrode (lithium electrode) was charged to 1.0 V at a current corresponding to 10 C. The lithium electrode was then discharged to 2.5 V at a current corresponding to 10 C and the initial discharge capacity was then measured. The capacity was calculated per unit weight of lithium titanate used.

(Discharge Capacity Retention)

The lithium electrode was charged to 1.0 V at a current corresponding to 100 C and then discharged to 2.5 V at a current corresponding to 100 C and the initial discharge capacity was then measured. As shown in the equation below, the discharge capacity retention was calculated as a ratio of the discharge capacity at 100 C to the discharge capacity at 10 C and the rate characteristic was evaluated.

The x C as used herein means the current value at which charge or discharge is completed in 1/x hours. Therefore, a discharge rate of 100 C means a current value at which charge or discharge is completed in (1/100) hours.

Discharge Capacity Retention (%)=[(discharge capacity at 100 C)/(discharge capacity at 10 C)]×100

Note that because the half-cell in which lithium titanate particles in Comparative Example 1 were used had high resistance, it caused overvoltage when the current value was increased, so that its discharge capacity retention could not be measured.

TABLE 1

| | Powder Properties | | | Cell Characteristics | |
| --- | --- | --- | --- | --- | --- |
| | Crystal Phase | Specific Surface Area [$m^2/g$] | Average Particle Diameter [μm] | Intial Discharge Capacity [mAh/g] | Discharge Capacity Retention [%] 10 C/100 C |
| Ex. 1 | $Li_{1.35}Ti_{1.66}O_4$ | 118 | 7 | 105 | 81 |
| Ex. 2 | $Li_{1.33}Ti_{1.66}O_4$ | 43 | 38 | 64 | 50 |

TABLE 1-continued

|  | Powder Properties | | | Cell Characteristics | |
|---|---|---|---|---|---|
|  |  |  |  | Intial | Discharge Capacity Retention [%] |
|  | Crystal Phase | Specific Surface Area [m$^2$/g] | Average Particle Diameter [μm] | Discharge Capacity [mAh/g] | 10 C/100 C |
| Ex. 3 | Li$_{1.33}$Ti$_{1.66}$O$_4$ | 77 | 7 | 126 | 48 |
| Ex. 4 | Li$_{1.33}$Ti$_{1.66}$O$_4$ | 75 | 4 | 119 | 82 |
| Ex. 5 | Li$_{1.33}$Ti$_{1.66}$O$_4$ | 38 | 82 | 105 | 50 |
| Ex. 6 | Li$_{1.33}$Ti$_{1.66}$O$_4$ | 9 | 9 | 65 | 26 |
| Ex. 7 | Li$_{1.33}$Ti$_{1.66}$O$_4$ | 71 | 19 | 102 | 58 |
| Comp. Ex. 1 | Li$_{1.33}$Ti$_{1.66}$O$_4$ TiO$_2$ rutile | 1 | 400 | 16 | unmeasurable |

As shown in Table 1, it can be seen that the half-cells in which the composite bodies in Examples 1 to 7 were used are superior in initial discharge capacity and discharge capacity retention to the half-cell in which the lithium titanate particles in Comparative Example 1 was used, and therefore they have excellent electrical characteristics.

The invention claimed is:

1. A method for producing a composite body of lithium titanate particles and a carbonaceous material, the method comprising the steps of:
    preparing a raw material mixture containing a titanium compound, a lithium compound, and an oligomer and/or raw material monomer of an alkali-soluble resin; and
    subjecting the raw material mixture to heat treatment under a non-oxidizing atmosphere to produce the composite body,
wherein the raw material mixture does not contain a polymer of the alkali-soluble resin.

2. The method for producing a composite body of lithium titanate particles and a carbonaceous material according to claim 1, wherein the alkali-soluble resin has, in a main chain or a side chain thereof, a hydroxyl group, a phenolic hydroxyl group, and/or a carboxyl group.

3. The method for producing a composite body of lithium titanate particles and a carbonaceous material according to claim 1, wherein the temperature of the heat treatment is 800 to 1000° C.

4. The method for producing a composite body of lithium titanate particles and a carbonaceous material according to claim 1, wherein the lithium titanate is a compound represented by a general formula Li$_x$Ti$_y$O$_4$ wherein the Li/Ti molar ratio of 0.68 to 0.82, x is within a range of 1 to 1.67, and y is within a range of 1.33 to 2.

5. The method for producing a composite body of lithium titanate particles and a carbonaceous material according to claim 1, wherein the method comprising the steps of:
preparing the raw material mixture by mixing a solvent, the titanium compound, the lithium compound, and the oligomer and/or raw material monomer of the alkali-soluble resin, and drying the resultant mixture.

6. The method for producing a composite body of lithium titanate particles and a carbonaceous material according to claim 5, wherein the solvent is selected from the group consisting of water; alcohols, such as methanol, ethanol, 1-propanol, 2-propanol, and 1-butanol; acetone.

7. The method for producing a composite body of lithium titanate particles and a carbonaceous material according to claim 5, wherein the drying comprises drying by heat application.

8. The method for producing a composite body of lithium titanate particles and a carbonaceous material according to claim 7, wherein the drying by heat application is performed simultaneously with the heat treatment under a non-oxidizing atmosphere to produce the composite body.

9. The method for producing a composite body of lithium titanate particles and a carbonaceous material according to claim 6, wherein water is used as the solvent, the drying is performed at 60 to 190° C.

10. The method for producing a composite body of lithium titanate particles and a carbonaceous material according to claim 1, wherein the titanium compound is compound containing titanium oxide (IV) or a compound producing titanium oxide (IV) by heat application.

11. A method for producing a composite body of lithium titanate particles and a carbonaceous material, the method comprising the steps of:
    preparing a raw material mixture containing a titanium compound, a lithium compound, and an oligomer and/or raw material monomer of an alkali-soluble resin; and
    subjecting the raw material mixture to heat treatment under a non-oxidizing atmosphere to produce the composite body,
    wherein an average particle primary particle diameter of the titanium compound is 1 to 99 nm.

12. The method for producing a composite body of lithium titanate particles and a carbonaceous material according to claim 1, wherein the lithium compound is selected from the group consisting of lithium carbonate, lithium acetate, and lithium hydroxide.

13. The method for producing a composite body of lithium titanate particles and a carbonaceous material according to claim 2, wherein the alkali-soluble resin are selected from the group consisting of novolac resins, resol resins, polyvinyl phenol resins, acrylic resins, copolymers of acrylic acid derivatives having a phenolic hydroxyl group; cycloolefin resins; and polyamide resins.

14. The method for producing a composite body of lithium titanate particles and a carbonaceous material according to claim 1, wherein the raw material monomer of the alkali-soluble resin includes phenolic compounds and aldehyde compounds.

15. The method for producing a composite body of lithium titanate particles and a carbonaceous material according to claim 14, wherein the molar ratio (F/P) of the aldehyde compound (F) to the phenolic compound (P) is 0.1 to 10.0.

16. The method for producing a composite body of lithium titanate particles and a carbonaceous material according to claim 14, wherein the molar ratio (C/P) of the lithium compound (C) to the phenolic compound (P) is 1.0 to 9.0.

17. The method for producing a composite body of lithium titanate particles and a carbonaceous material according to claim 1, wherein an average particle diameter of the composite body is within a range of 1 to 500 μm.

* * * * *